United States Patent [19]

Woloveke et al.

[11] 4,145,940
[45] Mar. 27, 1979

[54] BRAKE APPARATUS FOR A MOTOR DRIVEN SAW BLADE

[76] Inventors: Eugene L. Woloveke, 864 Dolphin Dr., Danville, Calif. 94526; Marvin M. Thompson, 2137 Otis Dr. #208, Alameda, Calif. 94501

[21] Appl. No.: 872,501

[22] Filed: Jan. 26, 1978

[51] Int. Cl.² .............................................. B27B 5/38
[52] U.S. Cl. ......................................... 83/68; 30/388; 83/666; 188/75
[58] Field of Search ................... 83/68, 69, 469, 666; 30/388; 188/75

[56] References Cited

U.S. PATENT DOCUMENTS

| | | | |
|---|---|---|---|
| 1,811,056 | 6/1931 | Tannewitz | 83/68 |
| 2,512,970 | 6/1950 | Rogne | 83/666 |
| 2,785,710 | 3/1957 | Mowery | 83/68 |
| 2,822,064 | 2/1958 | Weiland | 188/75 |
| 3,224,474 | 12/1965 | Bloom | 83/68X |
| 3,292,673 | 12/1966 | Gregory | 83/68 X |

*Primary Examiner*—Donald R. Schran
*Attorney, Agent, or Firm*—Phillips, Moore, Weissenberger, Lempio & Majestic

[57] ABSTRACT

A brake apparatus is disclosed for a motor driven saw blade, and includes a hub threadably attached at one end along its centerline axis to a drive motor, and attached to a saw blade via a flange formed on the other end of said hub, said hub having the shape of a cylinder. Also included are two brake shoes, one situated on each side of the hub, with each shoe including a brake pad portion thereon, such that when said brake shoes are actuated by brake actuation means operatively connected to said brake shoes, said shoes are caused to squeeze together to thereby brake rotative movement of said hub and therewith said saw blade. Means are also provided for adjusting the extent of brake shoe displacement during actuation as needed due to brake pad wear.

10 Claims, 3 Drawing Figures

BRAKE APPARATUS FOR A MOTOR DRIVEN SAW BLADE

BACKGROUND OF THE INVENTION

In the past, motorized saws were conventionally not braked after a given cutting operation. However, more recently as part of a drive to increase safety in industry, investigation of the problem of braking such blades after cutting was begun. Most recent attempts at braking the rotation of saws has usually been to use the approach of dynamically braking the blade, i.e., reversing the phase of the electrical impulses to the saw motor, to thereby electrically restrain further rotational movement of the saw blade attached thereto. However, this method precludes the use of a screw-on type of attachment between the saw motor and the blade since such braking would create forces that may cause the blade to unscrew from the motor shaft. It is also an unsatisfactory method since a large amount of power would be needed to stop the blade's movement with any degree of speed.

Another aspect of the braking problem concerns the size constraints involved in placing a brake apparatus external to the saw motor. Such an apparatus must be small enough not to be a limiting factor on the width of a given wood member to be cut by the saw blade. Thus, it was found that a disc brake system was inappropriate due to the fact that to make the brake disc size small enough to not limit the width of the wood member to be cut, the pad surface area available for the disc brake was too small. Testing the operation with such a brake, it was found that the disc pads wore very quickly, and were inefficient in quickly reducing saw blade rotation.

A third problem in adding a brake apparatus external to a drive motor is the problem of coupling the brake apparatus to the drive shaft and the blade. Conventional means for coupling would include a plurality of setscrews to hold the brake apparatus to the drive shaft. However, with this method there would be much more of a tendency for the setscrews to shear, due to the high stress experienced when braking of saw blade rotation is done quickly.

SUMMARY OF THE INVENTION

The present invention relates to a brake apparatus for braking the rotative movement of a saw blade driven by a motor, when cutting of a wood member or the like has been completed. The brake apparatus is interposed between the drive motor and the saw blade and includes a hub threadably attached at one end along its centerline axis to the drive shaft of the motor, with the other end of the hub including a flange designed to have the saw blade attached thereto. The main body of the hub is in a cylindrical shape, the outer surface thereof providing a maximum braking surface for two brake shoes, each one placed on opposite sides of the cylinder portion of said hub, such that when said brake shoes are caused to be squeezed towards one another, contact with the hub is initiated, and braking of the rotative movement of the hub is thereby enabled. The brake shoes include conventional brake pad material operatively adjacent the hub surface. The brake shoes are pivotally attached one with the other at one end, and attached by brake actuation means at their other end. When activated, the brake actuation means causes the brake shoes to squeeze together, thereby causing the desired braking action.

The brake apparatus is sized such that it does not lessen the maximum possible width of any member to be cut by the saw blade. This is accomplished by sizing the brake apparatus such that along the path of cutting of a wood member, the brake apparatus does not extend out farther than the diameter of the saw motor.

Therefore, a principal object and advantage of the present invention is to provide a brake apparatus for a saw which will efficiently and quickly reduce the rotating speed of a saw blade when the apparatus is actuated, without the apparatus being of a size that would limit the width of a member to be cut.

A further object of the present invention is to provide a brake apparatus wherein the apparatus may be easily installed between a drive motor and a saw blade, and wherein the braking mass is close to the mass of the rotating blade so that it can be most effectively counteracted.

Another object of the present invention is to provide a brake apparatus that maximizes the surface area available for braking, to thereby minimize wear on brake pads due to overloading, or due to the existence of particulate matter on the brake surface.

A still further object of the invention is to provide a brake apparatus wherein the hub of the apparatus is screwed onto the motor drive shaft such that both when drag is experienced on the blade, and during braking, the hub is caused to tighten against the drive shaft threads.

Another object of the present invention is to provide a brake apparatus wherein adjustment means are included for the brake pads, to enable their adjustment for initial fit, and for facilitating further fit adjustments as needed due to wearing of the brake pads.

These and other objects and advantages of the present invention will become more clear upon reference to the following description and accompanying drawings.

DESCRIPTION OF A PREFERRED EMBODIMENT

Figure 1:
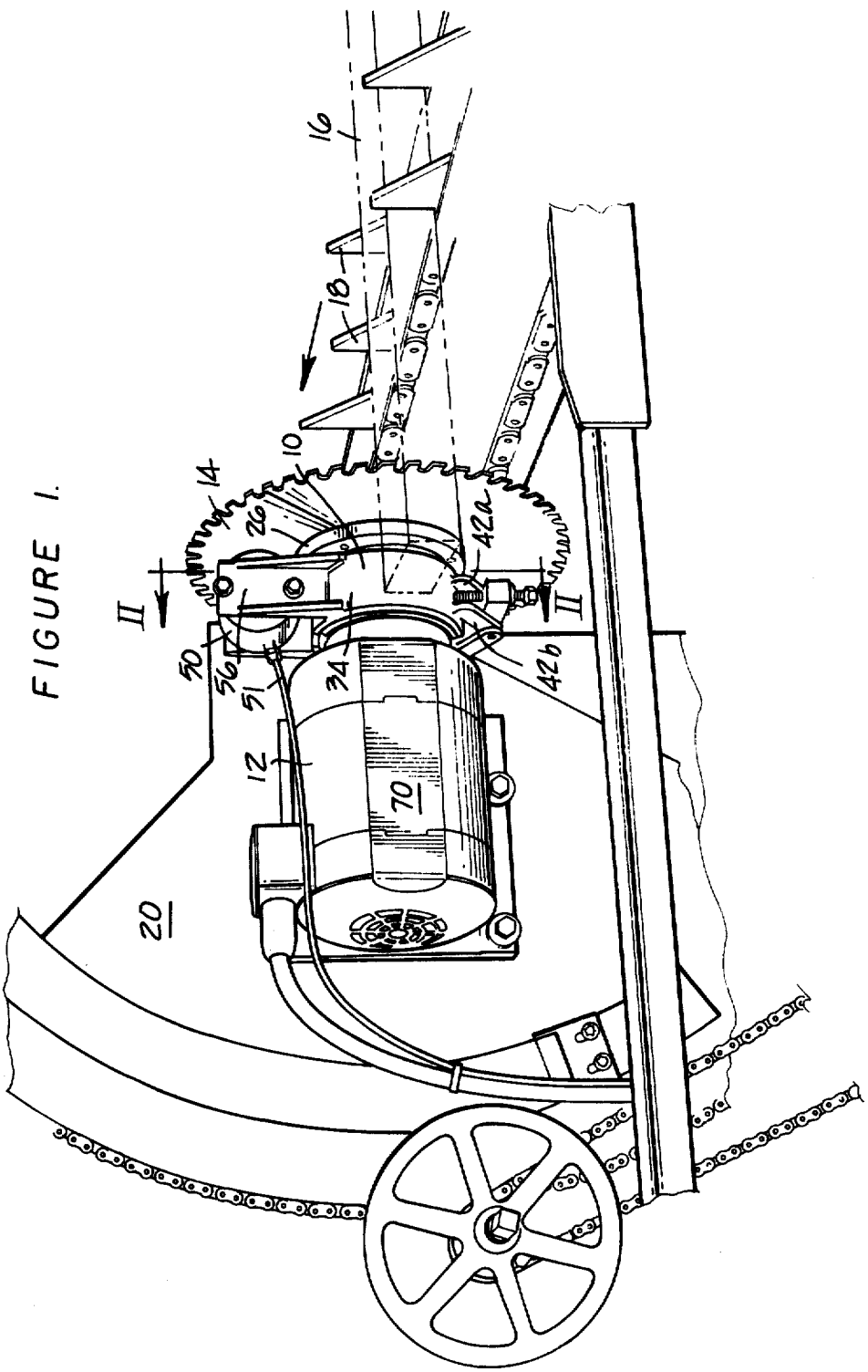
FIG. 1 is a perspective view of the brake apparatus of the present invention showing placement of the apparatus with respect to a motorized saw blade.

The brake apparatus of the present invention is illustrated generally in FIG. 1 at 10. The brake apparatus is operatively positioned between a drive motor 12 and a saw blade 14. In the present embodiment of the invention, the saw blade 14 is designed to cut wood members, as exemplified by the wood member 16 showed in phantom, as each wood member is caused to come in contact with the saw blade 14 by means of a conveyor system 18 moving in the direction as shown.

The drive motor 12 and the brake apparatus 10 are mounted to a plate 20 which is designed to enable the saw blade 14 to be oriented at various angular positions with respect to the conveyor system 18, and therefore timber members traveling thereon, to enable variation in the type of cuts made in such timber members 16.

Figure 3:
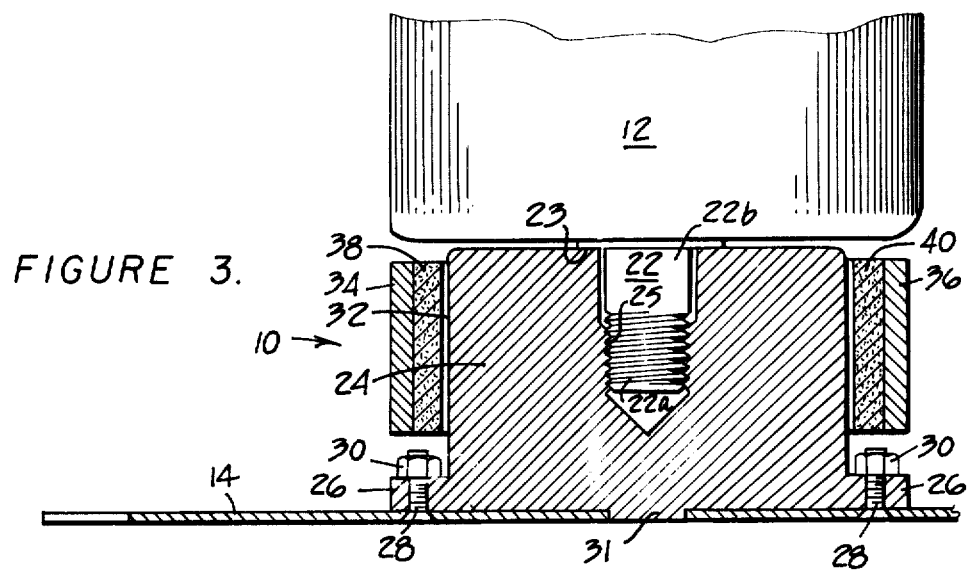
FIG. 3 is a cross-sectional view of the hub and brake shoes of the present invention, taken along the lines III—III of FIG. 2.
Figure 2:
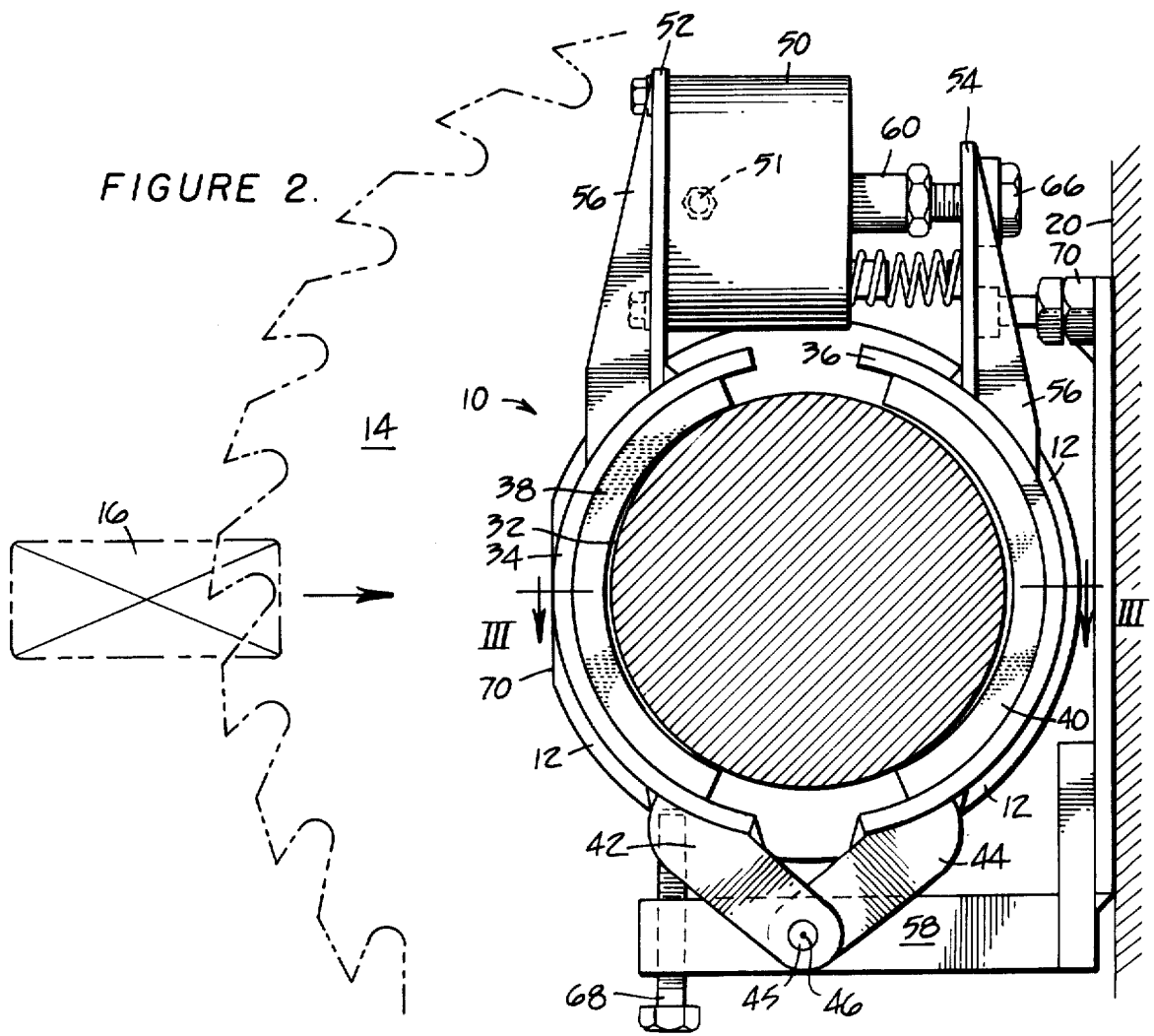
FIG. 2 is a cross-sectional view of the brake apparatus of the present invention along the lines II—II of FIG. 1.

FIG. 3 is a cross-sectional view of the hub and brake shoes of the present invention, taken along the lines III—III of FIG. 2. As can be seen in FIG. 3, the drive motor 12 includes a drive shaft 22 extending therefrom.

Drive shaft 22 includes a threaded portion 22a at its end, a non-threaded shaft portion 22b, and an annular shoulder portion 23 positioned nearest to the drive motor 12. A hub 24 is shown threadably attached to the drive shaft 22 via a threaded bore 25 formed in hub 24. Note that the threads are defined only in the lower part of bore 25.

The opposite or second end of the hub 24 includes an annular flange 26 formed thereon. The blade 14 is operatively attached to the flange 26 of hub 24 by means of screws 28 and nuts 30 spaced around said flange. For safety, screws 28 are threadably attached to flange 26, with nuts 30 functioning as lock nuts to guard against having the screws 28 come loose and back out of flange 26. Note that screws 28 are flathead screws so that the surface of the blade 14 facing a given wood member 16 being cut will be flat. Any projections on this surface would catch such a member as it moves past the blade.

Hub 24 also includes a centering stub 31 defined on the second end of the hub. With a hole bored through the centerpoint of said blade 14 having a diameter substantially equal to the diameter of said stub 31, this stub 31 acts to ensure that the saw blade 14 is properly positioned with respect to the hub during the blade's installation thereon. The stub 31 also is defined to be flush with the outer surface of saw blade 14 after installation of the blade on hub 24. Further, when installing hub 24 onto shaft 22, since the bore 25 does not have threads in its upper section, bore 25 acts as a guide means for fastening hub 24 to shaft 22. Shoulder 23 of drive shaft 22 is designed to act as a stop means for ending the tightening of said hub 24 onto shaft 22.

The surface 32 of hub 24, between its flange portion 26 and its other end, is defined in a cylindrical shape, and the centerline axis of this cylinder lies along the axis of drive shaft 22. Operatively adjacent to surface 32 are brake shoes 34 and 36, shown in cross-section in FIG. 3, and in side view in FIG. 2. These brake shoes 34, 36 include brake pad portions attached thereto, as shown respectively at 38 and 40.

FIG. 2 is a cross-sectional view of the brake apparatus taken along the lines II—II of FIG. 1. As seen in FIG. 2, the brake shoes 34, 36 are pivotally attached to one another at one end by means of angled levers 42 and 44 which are pivotally connected together by pivot pin 45 at pivot point 46. As seen in FIG. 1, each angled lever 42, 44, in the present embodiment, comprises two lever portions, shown as 42a and 42b, thereby providing greater support for the functioning of the brake shoes 34, 36.

The opposite ends of brake shoes 34, 36 are operatively connected to brake actuation means. This means causes the shoes to squeeze together when the means is actuated to thereby brake rotative movement of the hub 24, and therewith drive shaft 22 and saw blade 14.

In the present embodiment, the brake actuation means comprises an air actuated valve means 50 operatively positioned between two actuating levers 52 and 54. Lever 52 is operatively connected to brake shoe 34 and lever 54 is operatively connected to brake shoe 36. Each lever 52, 54 further includes at least one supporting bracket portion 56, which provide greater support for the brake actuation means with respect to the brake shoes 34, 36.

As best seen in FIG. 1, pressurized air is coupled to valve means 50 via conduit 51 from a source, not shown, which is controlled in a conventional manner such that the desired pressurized air is coupled to valve means 50 when braking of the saw blade is required. Note that a hydraulically controlled valve means 50, with an associated hydraulic fluid source, is also anticipated as being within the scope of the present invention. Note also that valve means 50 may be designed such that a lack of air pressure to valve means 50 causes brake actuation to result. This would provide another attribute of safety, since saw blade rotation would be precluded whenever there was a leak in conduit 51 or a failure in the operation of the source of the pressurized air.

In operation, when the valve means 50 is actuated, it causes a piston 60 to be drawn into the valve means. As seen in FIG. 2, the piston 60 is operatively connected to lever 54, while the body of valve means 50 is operatively connected to lever 52. Consequently, when valve means 50 is actuated, piston 60 causes the lever 54 to be drawn towards lever 52. The resultant displacement of the two levers 52, 54 together causes brake shoes 34, 36 to squeeze together, such that the brake pads 38, 40 are caused to come in contact with the hub 24. This results in the applying of frictional resistance to the hub, which thereby slows the rotation of the saw blade 14. The pivot pin 45, at the opposite end of the brake shoes 34, 36 facilitates this squeezing together of the brake shoes against hub 24. As can also be seen, the drag produced on hub 24 either due to this braking or due to resistance felt during cutting, causes hub 24 to be retained in a tight fit on threaded drive shaft 22 up against shoulder 23. Thus, much of the load felt during such decelerations is felt against this shoulder 23.

Note that a spring means 62 is operatively positioned between the two levers 52, 54. This spring means functions to force levers 52 and 54 apart when valve means 50 is not actuated. Thus, spring means 62 acts to insure that brake pads 38 and 40 do not contact the surface of hub 24 unless the brake actuation means has been actuated.

A mounting bracket 58 is included as support means for the brake apparatus of the present invention. The mounting bracket 58 is affixed to plate 20 at one end, and provides support for pivot pin 45 and thereby brake shoes 34, 36 and the brake actuation means. A spacer and secondary support 70 is also provided both to facilitate the correct placement of the brake pads 38, 40 with respect to hub 24 and thereby drive motor 12, and to support the brake apparatus 10 during braking of the saw blade 14 thereby.

As described in the summary, a threaded coupling of drive shaft 22 to hub 24 is preferred for braking due to shearing encountered when using setscrew or drive pin arrangements for such couplings. The apparatus of the present invention provides a further safety feature in that since hub 24 and drive shaft 22 are effectively encased within brake shoes 34, 36 and supported during braking by said shoes 34, 36 and a mounting bracket 58, in the unlikely event that the shaft 22 sheared, the brake apparatus 10 would tend to contain pieces which may be generated thereby.

Means are also provided for enabling the adjusting in a simple, efficient manner, of the position of the brake pads 38, 40 with respect to the surface of hub 24. The first brake adjustment means comprises setscrew 66 which defines the end stop of piston 60. This setscrew controls the extent of the closing, or squeezing together of levers 52, 54 during actuation of valve means 50. The purpose of this first brake adjustment means is to provide a means for periodically increasing the extent of squeezing of the brake pads 38, 40 against hub 24 to compensate for the increased displacement required due to brake pad wear.

The second brake adjustment means comprises setscrew 68 which is threadably attached to mounting bracket 58. The end of setscrew 68 is designed to abut brake shoe 34 near its lower end thereof, and to have the function of controlling the extent to which the brake shoes 34, 36 can pivotally extend away from one another. Such adjustment means is needed when the brake apparatus is initially mounted with respect to the drive motor 12 and saw blade 14, to insure a proper fit of the brake pads 38, 40 with respect to the surface 32 of hub 24.

Although the hub 24 of the present embodiment is substantially a solid metal block, this construction is not necessary for operation of the brake apparatus 10. This large mass, in fact, tends to restrain quick braking. Thus, a hollowed out hub 24 would also be within the scope of the present invention. A solid, high mass hub provides a flywheel function, so that a smaller motor 12 can keep the blade 14 spinning at a constant RPM even during periods of heavy cutting load.

Finally, as best seen in FIGS. 1 and 2, the brake apparatus 10 of the present invention is sized so that it does not lessen the maximum possible width of any member to be cut by the saw blade, while providing at the same time the maximum surface area possible for brake pad contact. As best seen in FIG. 2, the brake apparatus extends to as large a diameter as it can, without extending out farther than the surface 70 of the drive motor 12. Thus, as a wood member 16 is cut by saw blade 14, it would abut the surface 70 before coming in contact with the brake apparatus 10. Therefore, surface 70 defines the maximum extent that blade 14 can cut into a wood member 16 during a given cutting operation.

It is to be understood that the foregoing description is merely illustrative of a preferred embodiment of the invention and that the scope of the invention is not to be limited thereto, but is to be determined by the scope of the appended claims.

I claim:

1. A brake apparatus for a saw comprising:
   a motor including a threaded drive shaft extending therefrom;
   a saw blade operatively attached to said drive shaft;
   a hub threadably attached to said drive shaft, said hub having a shape of a cylinder whose centerline axis lies along the axis of said shaft;
   two brake shoes, operatively positioned one on each side of said hub and substantially adjacent thereto, each shoe including a brake pad portion thereon, said shoes pivotally attached one with the other at a first end, each said shoe shaped such that said brake pad portion thereof is defined in a shape corresponding to the surface shape of said hub; and
   brake actuation means operatively connected to the second end of said shoes, said means causing said shoes to squeeze together when said means is actuated, to thereby brake rotative movement of said saw blade.

2. A brake apparatus for a saw comprising:
   a motor including a threaded drive shaft extending therefrom;
   a saw blade;
   a hub threadably attached to said drive shaft at one end and having an annular flange defined on its second end, said hub having a shape therebetween of a cylinder whose centerline axis lies along the axis of said shaft;
   means for attaching said saw blade to said flange;
   two brake shoes, operatively positioned one on each side of said hub and substantially adjacent thereto, each shoe including a brake pad portion thereon, said shoes pivotally attached one with the other at a first end, each said shoe shaped such that said brake pad portion thereof is defined in a shape corresponding to the surface shape of said hub; and
   brake actuation means operatively connected to the second end of said shoes, said means causing said shoes to squeeze together when said means is actuated to thereby brake rotative movement of said saw blade.

3. The brake apparatus of claim 2 wherein said drive shaft threads are defined in a direction such that as said brake apparatus is actuated, said hub is caused to tighten on said drive shaft.

4. The brake apparatus of claim 3, wherein said drive shaft further comprises stop means comprising an annular shoulder portion formed on said shaft at a point nearest said motor, said shoulder portion acting to stop further tightening of said hub onto said shaft.

5. The brake apparatus of claim 2 wherein said means for attaching said saw blade to said flange comprises:
   a plurality of flathead screws, each fastenable in one of a plurality of threaded bores defined in said flange; and
   a centering stub formed on the second end of said hub, said saw blade including a hole bored through its center point defined to have a diameter substantially equal to the diameter of said stub to ensure proper positioning of said saw blade with respect to said hub.

6. The brake apparatus of claim 2 wherein said brake actuation means comprises valve means including a piston operatively connected to said valve means such that when said valve means is actuated, said piston is drawn into the valve means,
   said piston operatively connected to a first one of said brake shoes, said valve means operatively connected to the second brake shoe, such that when said valve means is actuated, said brake shoes are caused thereby to squeeze together against said hub.

7. The brake apparatus of claim 6 wherein said brake actuation means further comprises spring means operatively positioned between said brake shoes at their second end, said means causing said shoes to be forced apart when said valve means is not actuated.

8. The brake apparatus of claim 6 further comprising means for adjusting the position of said brake pads with respect to the surface of said hub.

9. The brake apparatus of claim 8, wherein said means for adjusting said brake pads comprises first brake adjustment means including a setscrew operatively connected to said piston, and defining thereby the adjustable end stop of said piston and associated said first brake shoe.

10. The brake apparatus of claim 8, wherein said means for adjusting the position of said brake pads further comprises second brake adjustment means, said means including a second setscrew operatively positioned with respect to said first end of said brake shoes and operatively positioned so that it may adjustably abut said second brake shoe, to thereby control the extent to which said second brake shoe may pivotally extend away from said first brake shoe.

* * * * *